(12) United States Patent
Melfi et al.

(10) Patent No.: US 9,705,388 B2
(45) Date of Patent: Jul. 11, 2017

(54) ROTOR FOR A LINE START PERMANENT MAGNET MACHINE

(75) Inventors: Mike Melfi, Richfield, OH (US); Rich Schiferl, Chagrin Falls, OH (US); Stephen Umans, Belmont, MA (US)

(73) Assignee: BALDOR ELECTRIC COMPANY, Forth Smith, AR (US)

( * ) Notice: Subject to any disclaimer, the term of this patent is extended or adjusted under 35 U.S.C. 154(b) by 1230 days.

(21) Appl. No.: 13/329,814

(22) Filed: Dec. 19, 2011

(65) Prior Publication Data

US 2013/0154426 A1 Jun. 20, 2013

(51) Int. Cl.
*H02K 1/27* (2006.01)
*H02K 21/46* (2006.01)
*H02K 1/22* (2006.01)

(52) U.S. Cl.
CPC ............ *H02K 21/46* (2013.01); *H02K 1/223* (2013.01); *H02K 1/276* (2013.01); *H02K 2213/03* (2013.01)

(58) Field of Classification Search
CPC ........ H02K 21/46; H02K 1/276; H02K 19/14; H02K 19/02; H02K 17/16; H02K 1/223; H02K 2213/03; H02K 17/26
USPC .... 310/156.82, 156.76, 125, 156.78, 156.83, 310/156.84
See application file for complete search history.

(56) References Cited

U.S. PATENT DOCUMENTS

| | | | |
|---|---|---|---|
| 4,139,790 A * | 2/1979 | Steen ..................... | H02K 21/46 310/156.83 |
| 4,403,161 A * | 9/1983 | Miyashita .............. | H02K 1/276 310/156.83 |
| 4,476,408 A | 10/1984 | Honsinger | |
| 4,568,846 A * | 2/1986 | Kapadia ................... | 310/156.83 |
| 4,918,831 A * | 4/1990 | Kliman ........................... | 29/598 |
| 5,097,166 A * | 3/1992 | Mikulic ................. | H02K 21/46 310/156.83 |
| 5,672,926 A | 9/1997 | Brandes et al. | |
| 6,552,462 B2 * | 4/2003 | Sakai et al. .............. | 310/156.78 |
| 6,727,627 B1 * | 4/2004 | Sasaki .................... | H02K 21/46 310/156.53 |
| 6,917,133 B2 | 7/2005 | Koharagi et al. | |

(Continued)

FOREIGN PATENT DOCUMENTS

| | | | | |
|---|---|---|---|---|
| BR | WO 2008019459 A1 * | 2/2008 | ............ | H02K 1/276 |
| CN | 102047531 A | 5/2011 | | |

(Continued)

*Primary Examiner* — Burton Mullins
(74) *Attorney, Agent, or Firm* — Thompson Coburn LLP

(57) ABSTRACT

A rotor comprises laminations with a plurality of rotor bar slots with an asymmetric arrangement about the rotor. The laminations also have magnet slots equiangularly spaced about the rotor. The magnet slots extend near to the rotor outer diameter and have permanent magnets disposed in the magnet slots creating magnetic poles. The magnet slots may be formed longer than the permanent magnets disposed in the magnets slots and define one or more magnet slot apertures. The permanent magnets define a number of poles and a pole pitch. The rotor bar slots are spaced from adjacent magnet slots by a distance that is at least 4% of the pole pitch. Conductive material is disposed in the rotor bar slots, and in some embodiments, may be disposed in the magnet slot apertures.

18 Claims, 6 Drawing Sheets

(56) References Cited

U.S. PATENT DOCUMENTS

| | | | |
|---|---|---|---|
| 7,170,209 B2 | 1/2007 | Araki et al. | |
| 7,183,685 B2 * | 2/2007 | Weihrauch | H02K 21/46 |
| | | | 310/156.53 |
| 7,183,686 B2 | 2/2007 | Sasaki et al. | |
| 7,247,965 B2 * | 7/2007 | Weihrauch | H02K 1/276 |
| | | | 310/156.78 |
| 7,372,183 B2 | 5/2008 | Sasaki et al. | |
| 7,385,328 B2 | 6/2008 | Melfi | |
| 7,923,881 B2 | 4/2011 | Ionel et al. | |
| 7,932,658 B2 * | 4/2011 | Ionel | 310/156.52 |
| 2006/0145557 A1 * | 7/2006 | Weihrauch | 310/156.78 |
| 2006/0158056 A1 * | 7/2006 | Weihrauch et al. | 310/156.78 |
| 2008/0030096 A1 | 2/2008 | Mehta | |
| 2008/0224558 A1 | 9/2008 | Ionel | |
| 2009/0160285 A1 * | 6/2009 | Kikuchi et al. | 310/156.78 |
| 2009/0184598 A1 * | 7/2009 | Nakano et al. | 310/156.78 |
| 2010/0133941 A1 | 6/2010 | Feng et al. | |
| 2011/0030419 A1 * | 2/2011 | Kikuchi et al. | 62/498 |
| 2011/0140560 A1 | 6/2011 | Nickoladze et al. | |
| 2012/0175989 A1 | 7/2012 | Mathoy et al. | |

FOREIGN PATENT DOCUMENTS

| | | |
|---|---|---|
| DE | 2621301 A1 | 12/1976 |
| DE | 10361246 A1 | 8/2005 |
| DE | 103661246 A1 | 8/2005 |
| DE | 102005060119 A1 | 7/2006 |
| EP | 0072460 A1 | 2/1983 |
| EP | 352573 A1 | 1/1990 |
| GB | 917209 A | 1/1963 |
| GB | 1552694 A | 9/1979 |
| JP | 56-149583 | 11/1981 |

\* cited by examiner

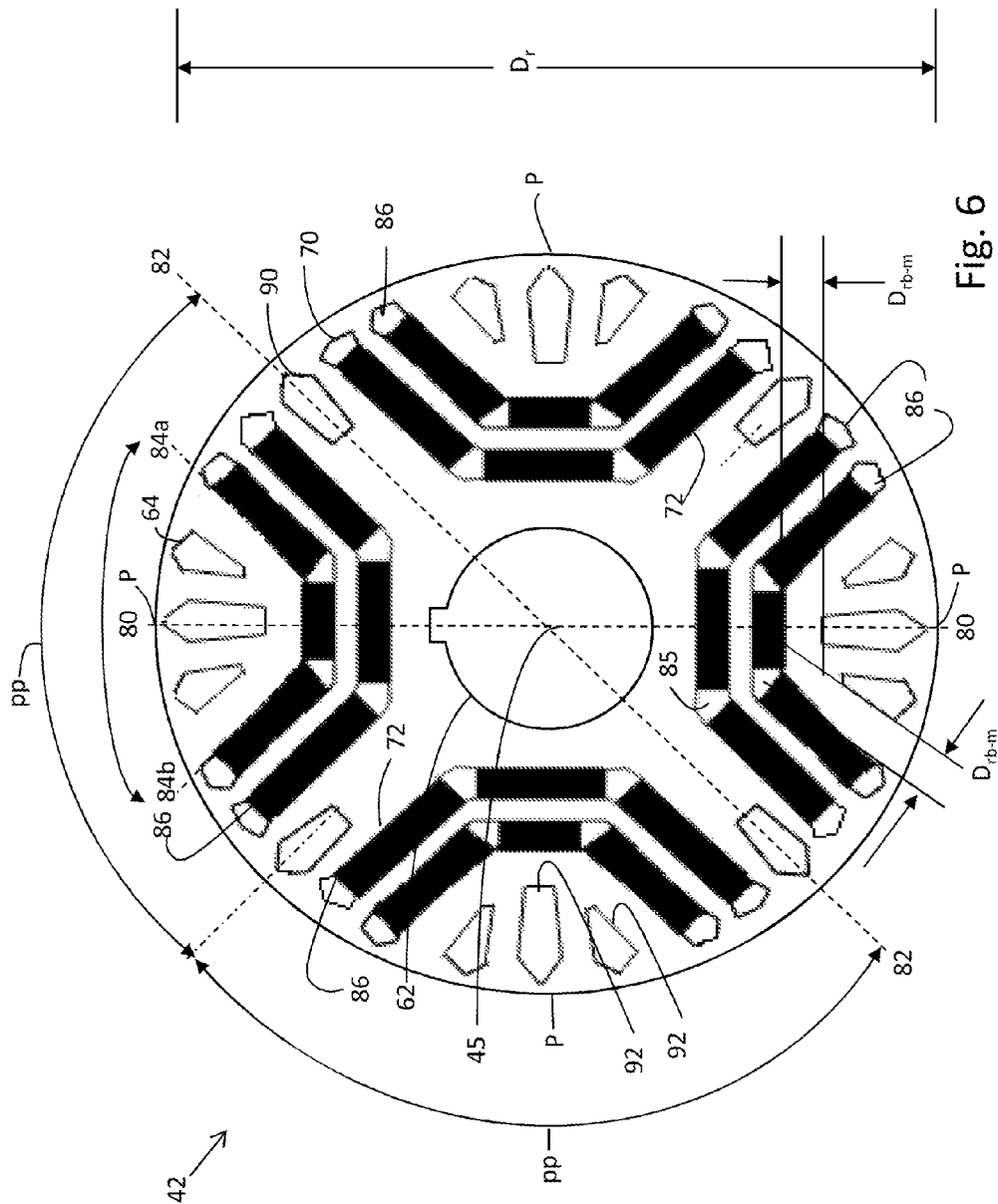

US 9,705,388 B2

ROTOR FOR A LINE START PERMANENT MAGNET MACHINE

STATEMENT REGARDING FEDERALLY SPONSORED RESEARCH OR DEVELOPMENT

This invention was made with Government support under agreement no. DE-FG36-08GO180132 awarded by the Department of Energy. The Government has certain rights in this invention.

BACKGROUND

The disclosure relates to laminations for rotors used in line-start, permanent magnet machines. In other words, the motor operates using principles of synchronous machines for operation at synchronous speed, and principles of induction machines for starting of the motor.

BRIEF DESCRIPTION OF THE DRAWINGS

FIGS. 3-6 show illustrative embodiments of laminations used in a rotor of the motor of FIG. 1.

DETAILED DESCRIPTION

Figure 1:
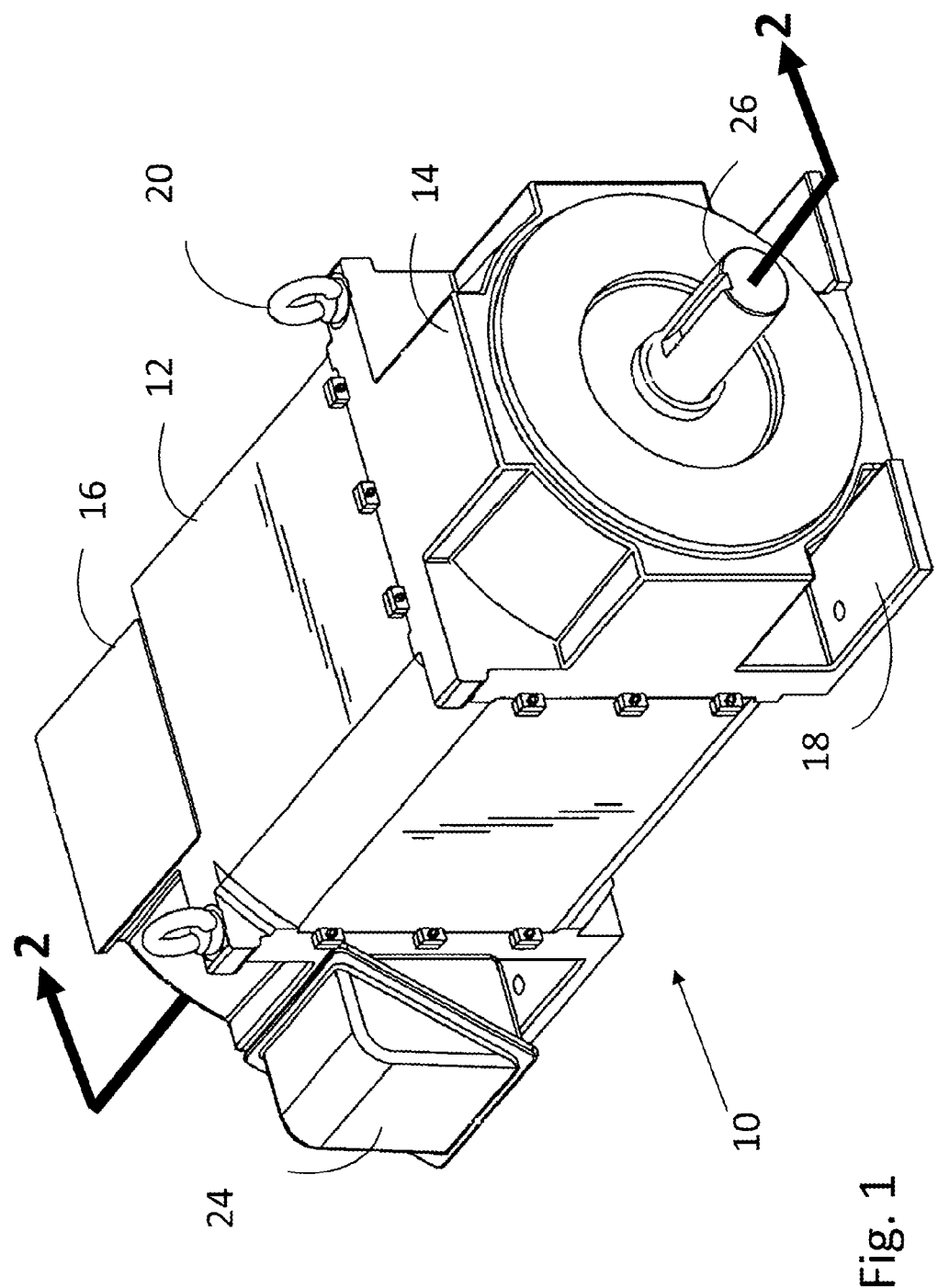
FIG. 1 is a perspective view of a permanent magnet motor with induction operation for starting of the motor.

Turning to the drawings, FIG. 1 illustrates an exemplary electric motor 10. In the embodiment illustrated, the motor 10 comprises a line start permanent magnet motor. The exemplary motor 10 comprises a frame 12 capped at each end by drive and opposite drive end caps 14,16, respectively. The frame 12 and the drive and opposite drive end caps 14,16 cooperate to form the enclosure or motor housing for the motor 10. The frame 12 and the drive and opposite drive end caps 14,16 may be formed of any number of materials, such as steel, aluminum, or any other suitable structural material. The drive and opposite drive end caps 14,16 may include mounting and transportation features, such as the illustrated mounting feet 18 and eyehooks 20.

To induce rotation of the rotor, current is routed through stator windings disposed in the stator. (See FIG. 2). Stator windings are electrically interconnected to form groups. The stator windings are further coupled to terminal leads (not shown), which electronically connect the stator windings to an external power source (not shown), such as 480 VAC three-phrase power or 110 VAC single-phase power. A conduit box 24 houses the electrical connection between the terminal leads and the external power source. The conduit box 24 comprises a metal or plastic material, and advantageously, provides access to certain electrical components of the motor 10. Routing electrical current from its external power source through the stator windings produces a magnetic field that induces rotation of the rotor. A rotor shaft 26 coupled to the rotor rotates in conjunction with the rotor. That is, rotation of the rotor translates into a corresponding rotation of the rotor shaft 26. As appreciated by those of ordinary skill in the art, the rotor shaft may couple to any number of drive machine elements, thereby transmitting torque to the given drive machine element. By way of example, machines such as pumps, compressors, fans, conveyors, and so forth, may harness the rotational motion of the rotor shaft 26 for operation.

Figure 2:
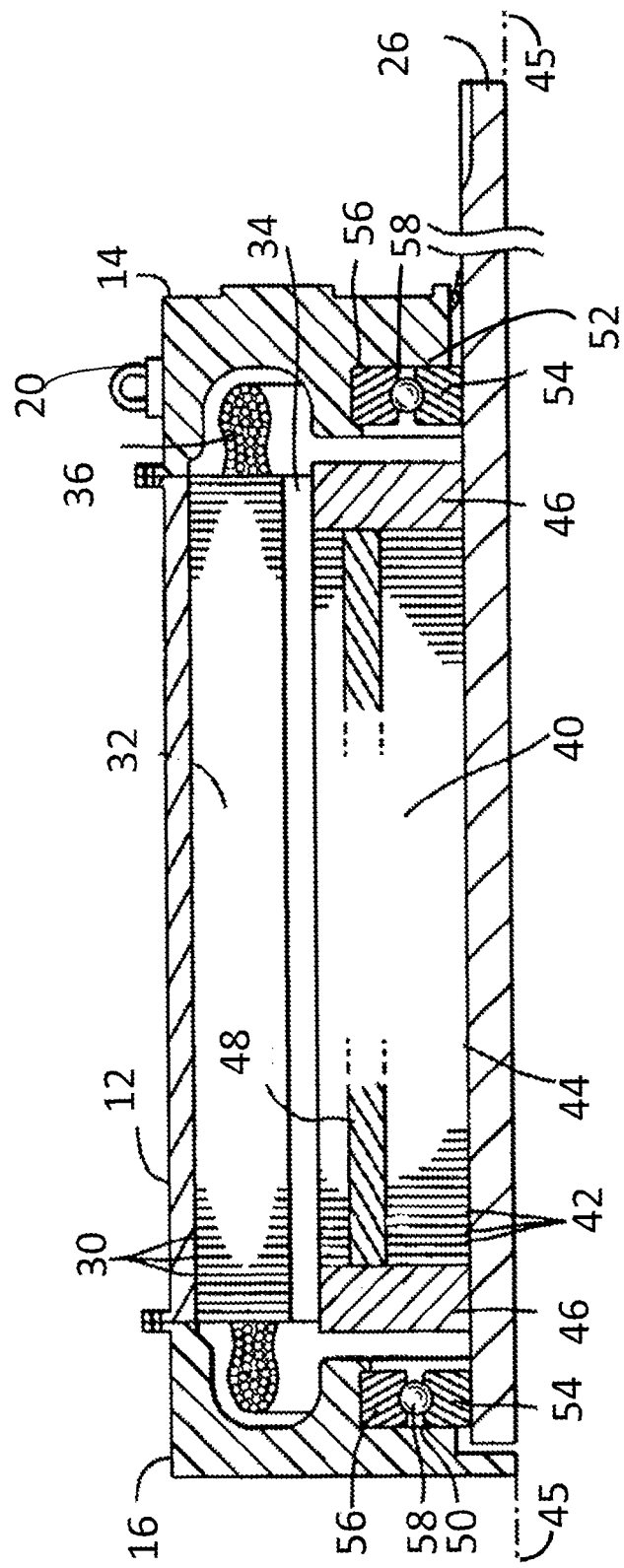
FIG. 2 is a partial cross-section view of the motor of FIG. 1 along plane 2-2.

FIG. 2 is a partial cross-section view of the motor 10 of FIG. 1 along plane 2-2. To simplify the discussion, only the top portion of the motor 10 is shown, as the structure of the motor 10 is essentially mirrored along its centerline. As discussed above, the frame 12 and the drive and opposite drive end caps 14,16 cooperate to form an enclosure or motor housing for the motor 10. Within the enclosure or motor housing resides a plurality of stator laminations 30 juxtaposed and aligned with respect to one another to form a lamination stack, such as a contiguous stator core 32. In the exemplary motor 10, the stator laminations 30 are substantially identical to one another, and each stator lamination 30 includes features that cooperate with adjacent laminations to form cumulative features for the contiguous stator core 32. For example, each stator lamination 30 includes a central aperture that cooperates with the central aperture of adjacent stator laminations to form a rotor chamber 34 that extends the length of the stator core 32 and that is sized to receive a rotor. Additionally, each stator lamination 30 includes a plurality of stator slots disposed circumferentially about the central aperture. These stator slots cooperate to receive one or more stator windings 36, which are illustrated as coil ends in FIG. 2, that extend the length of the stator core 32. As described in more detail below, upon start-up, the stator winding is energizable with an alternating voltage to establish a rotating primary field that co-acts with the rotor bars of the squirrel cage winding to start the rotor under induction motor principles.

In the exemplary motor 10, a rotor assembly 40 resides within the rotor chamber 34. Similar to the stator core 32, the rotor assembly 40 comprises a plurality of rotor laminations 42 aligned and adjacently placed with respect to one another. Thus, the rotor laminations 42 cooperate to form a contiguous rotor core 44. When assembled, the rotor laminations 42 cooperate to form a shaft chamber that extends through the center of the rotor core 44 and that is configured to receive the rotor shaft 26 therethrough. The rotor shaft 26 is secured with respect to the rotor core 44 such that the rotor core 44 and the rotor shaft 26 rotate as a single entity about a rotor center axis 45.

The exemplary rotor assembly 40 also includes electrically conductive members, such as rotor bars 48, disposed in the rotor core 44 electrically connected to rotor end members 46 to form the starting cage. The end members 46, which are disposed on opposite ends of the rotor core 44 are generally circular in cross-section and have an outer diameter that generally approximates the diameter of the rotor laminations 42. The rotor bars 48 in cooperation with the end members 46 form at least one closed electrical pathway for induced current within the rotor 40. Accordingly, the rotor bars 48 and the end members 46 comprise materials having good electrical conductivity, such as aluminum and copper. Additional detail of the rotor bars and the rotor laminations will be described in greater detail below.

To support the rotor assembly 40, the exemplary motor 10 includes drive and opposite drive bearing sets 50,52, respectively, that are secured to the rotor shaft 26 and that facilitate rotation of the rotor assembly 40 within the stationary stator core 32. During operation of the motor 10, the bearing sets 50,52 transfer the radial and thrust loads produced by the rotor assembly 40 to the motor housing. Each bearing set 50,52 includes an inner race 54 disposed circumferentially about the rotor shaft 26. The tight fit between the inner race 54 and the rotor shaft 26 causes the inner race 54 to rotate in conjunction with the rotor shaft 26. Each bearing set 50,52 also includes an outer race 56 and rotational elements 58, which are disposed between the inner and outer races 54,56.

The rotational elements 58 facilitate rotation of the inner races 54 while the outer races 56 remain stationary and mounted with respect to the drive and opposite drive end caps 14,16. Thus, the bearing sets 50,52 facilitate rotation of the rotor assembly 40 while supporting the rotor assembly 40 within the motor housing, i.e., the frame 12 and the drive and opposite drive end caps 14,16. To reduce the coefficient of friction between the races 54,56 and the rotational elements 58, the bearing sets 50,52 are coated with a lubricant. Although the drawings show the bearing sets 50,52 with balls as rotational elements, the bearing sets may be other constructions, such as sleeve bearings, pins bearings, roller bearings, etc.

FIGS. 3-6 provide further detail of illustrative embodiments of the rotor laminations 42. Each rotor lamination 42 has a generally circular cross-section and is formed of a magnetic material, such as electrical steel. Extending from end-to-end, i.e., transverse to the cross-section, each lamination 42 includes features that, when aligned with adjacent laminations 42, form cumulative features that extend axially through the rotor core 44. For example, each exemplary rotor lamination 42 has a circular shaft aperture 62 located in the center of the lamination 42. The shaft apertures 62 of adjacent laminations 42 cooperate to form a shaft chamber configured to receive the rotor shaft 26 (see FIG. 2) therethrough. The rotor core has an outer diameter "$D_r$".

Additionally, each lamination 42 includes a series of rotor bar slots 64 that are arranged at positions about the lamination such that when assembled, the rotor bar slots cooperate to form channels for the rotor bars that extend through the rotor core 44. The rotor bar slots are spaced radially inward from the rotor outer diameter $D_r$. As shown in the drawings, each of the rotor bar slots may extend radially outward to generally the same radial position relative to the rotor outer diameter $D_r$, or one or more rotor bar slots may extend radially outward and terminate at different radial distances relative to the outer diameter $D_r$, depending upon the application. The rotor bars 48 may present the same shape as the rotor bar slots 64 to provide a tight fit for the rotor bars 48 within the rotor channels. The rotor bars may be manufactured with tight tolerances between the rotor bars 48 and the rotor bar slots. The rotor bar slots may also be configured to receive electrically conductive material to form the rotor bars 48 for the starting cage of the motor. The conductive material may comprise a molten material introduced into the slots to form cast rotor bars. The end members may also be cast.

Figure 3:
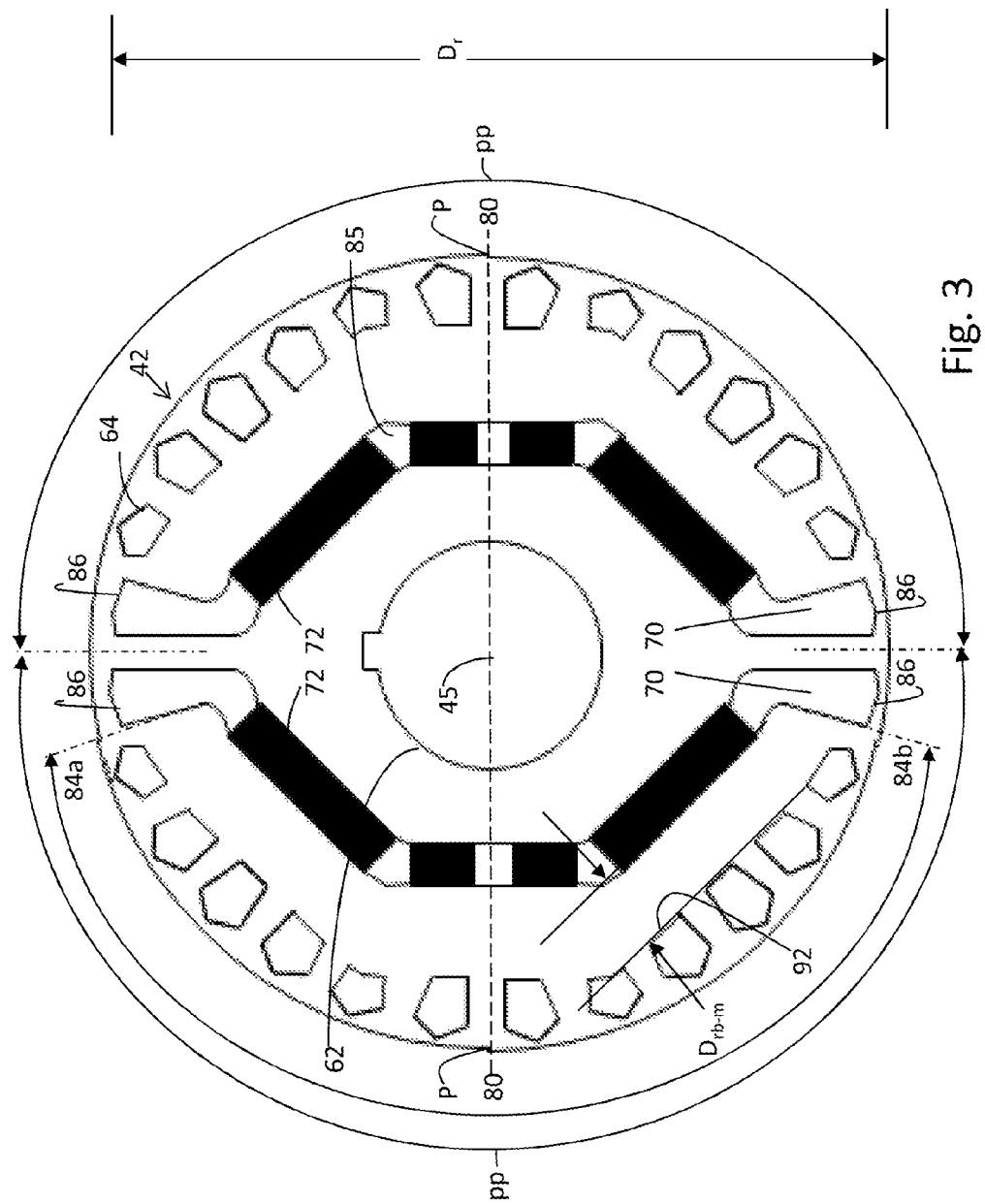
Figure 4:
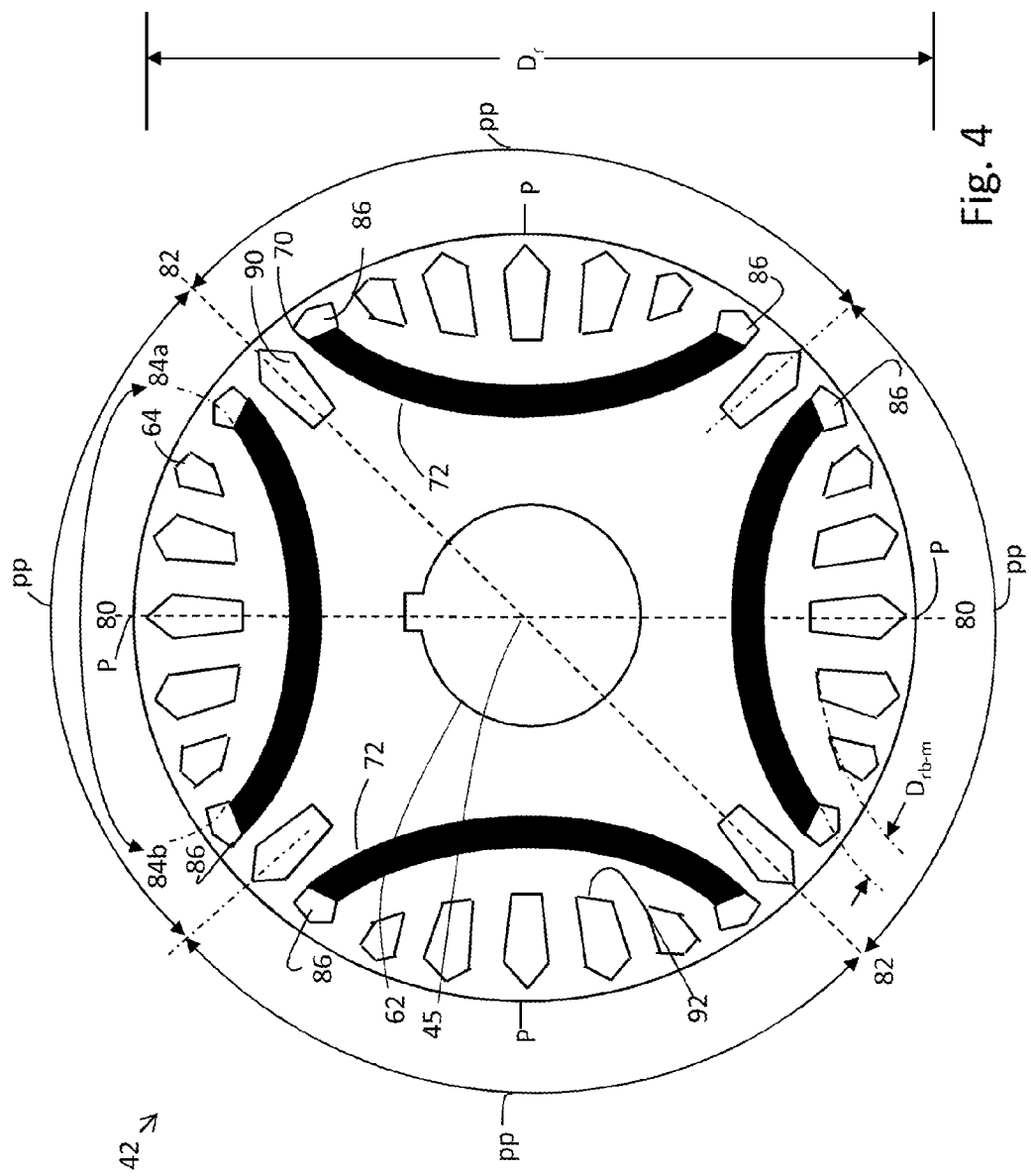
Figure 5:
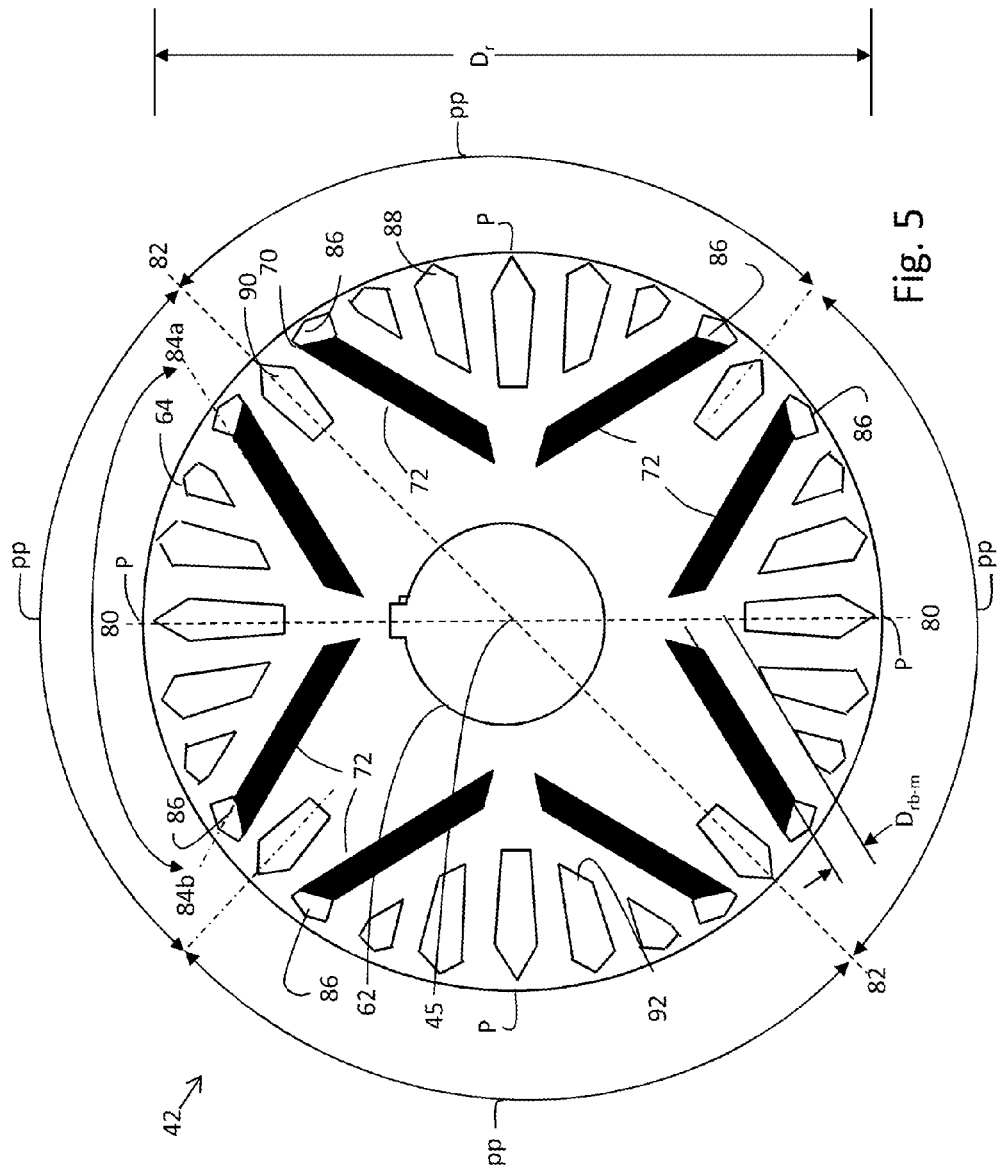

Additionally, the rotor laminations 42 include magnet slots 70. Magnets 72 may be disposed in the magnet slots in various ways to form poles for the rotor. The magnet slots may be arranged so the magnets are in a single layer or multi-layers. The magnet slots may also be arranged so the magnets form a conventional "v"- or "u"-shape, or an inverted "v"- or "u"-shape. There may be only one magnet per slot or multiple magnets per slot. The magnets may be magnetized in a generally radial direction to establish inwardly and outwardly disposed north and south poles on the magnets. This means that adjacent magnets cooperate to establish alternate north and south poles on the periphery of the rotor. The rotor may be constructed with any even number of poles. An exemplary lamination for a two pole motor is shown in FIG. 3, and exemplary laminations for a four pole motor are shown in FIG. 4-6. As shown in the drawings by example and not in any limiting sense, the magnets may establish a direct axis as indicated by reference character 80 and a quadrature axis as indicated by reference character 82. The magnets define a general axis of magnetization (north or south pole) on the periphery of the rotor. The edges of the magnet slots facing the general axis of magnetization, which are radially outward from the magnets, establish a generally arcuate saturation boundary area as indicated by reference characters 84a,84b. In cases, where a magnet is disposed in the magnet slot, the edges of the magnet slots facing the general axis of magnetization and the edges of the magnets will be the same. FIGS. 3 and 6 show embodiments where there is a gap 85 between the permanent magnets in the magnet slots. In a multi-layer arrangement such as shown in FIG. 6, the saturation boundary area is defined by the magnet slots that are nested radially outward the farthest.

In each of the designs of the laminations shown in FIGS. 3-6, the magnet slots 70 extend to the peripheral edge of the rotor such that an end of the magnet slot is adjacent the peripheral edge. One or more of the magnet slots may have its radially outward end at generally the same radial position relative to the rotor outer diameter $D_r$ and the rotor bar slots as shown in the drawings, or one or more magnet slots may extend radially outward and terminate at different distances relative to each other and/or the rotor bar slots, depending upon the application. The magnets 72 disposed in the magnet slots have a smaller longitudinal length in the direction of the magnet slots than the magnet slots such that the magnet when installed in the magnet slot forms a magnet slot aperture 86 between the end of the permanent magnet and the magnet slot. The magnet slot aperture may be filled with conductive material to form additional rotor bars that are also connected to the end members 46.

The rotor bars 48 forming the starting cage may have a different size, shape, and spacing from rotor bars found in a machine having a uniform cage. Additionally, the rotor bar slots 64 may be distributed about the rotor in a manner that is asymmetric rather than evenly distributed, i.e., asymmetric rather than equiangularly spaced, around the outer edge of the lamination surface. Additionally, the rotor bar slots may have an arbitrary shape. The laminations may be stacked off-set to one another such that the rotor bar in the slot has a helix relative to the rotor axis of rotation. Additionally, a rotor bar slot 90 may be provided to align with the quadrature axis 82. The rotor bar slot 90 of the quadrature axis may have a geometry which matches at least one of the rotor bar slots aligned with the direct axis 80. Although some of the drawings show a plurality of rotor bar slots in the direct axis and one rotor bar slot in the quadrature axis, other variations may be used.

The lamination designs shown in FIGS. 3-6 are designed to optimize paths for flux over a range of conditions including at rated load. In each of the designs of the laminations shown in FIGS. 3-6, the arrangement of the starting cage of the rotor bars and the magnets allows for passage of rotor flux under a wide range of loads and operating conditions. With each of the exemplar embodiments of FIGS. 3-6, the distance between the rotor bar slots disposed in the saturation boundary area 84a,84b and the magnet slots is controlled so that preferably each rotor bar slot in the saturation boundary area is positioned away from an adjacent magnet slot by a distance that equals or exceeds four percent (4%) of the pole pitch. In other words, the closest approach distance of any one of the rotor bar slots in the saturation boundary area to an adjacent magnet slot must equal or exceed four percent of the pole pitch. The closest approach distance is referred to hereinafter as ("$D_{rb-m}$") and is defined by the equation ("$D_{rb-m}$")≥0.04×("pp"). The pole pitch for the machine ("pp") may be defined by the equation ("pp") ={("$D_R$")×(π)}/("P"), where "$D_R$" is the diameter of the rotor and ("P") is the number of poles for the machine as defined by the number of groups of permanent magnets. One or more of the rotor bar slots in the saturation boundary area may be arranged to maintain this parameter relative to an adjacent magnet slot. Rotor bar slots outside of the saturation boundary area, for instance, rotor bar slots 90 generally aligned with the quadrature axis 82, may also be positioned to maintain this parameter relative to an adjacent magnet slot.

In the rotor designs shown in FIGS. 3-6, at least one of the rotor bar slots 64 in the saturation boundary area has a radial interior edge 92 which conforms generally to a side of the magnet 72 in the adjacent magnet slot 70. FIGS. 3-6 show the magnet arranged in the magnet slot in various configurations. In each example, the interior radial edge of one or more of the rotor bar slots 64 in the saturation boundary area has a geometry which generally matches the geometry of the magnet adjacent to the rotor bar slot. One or more of the rotor bar slots in the saturation boundary area may be formed to have a radial inward edge which defines a reference plane generally parallel to the adjacent magnet. In this way, one or more of the rotor bar slots may have a distance to the adjacent magnet slot that meets or exceeds the four percent (4%) of the pole pitch ("pp"). Rotor bar slots outside of the saturation boundary area, for instance, rotor bar slots 90 generally aligned with the quadrature axis 82, may also be shaped in a similar manner to maintain this parameter.

While certain embodiments have been described in detail in the foregoing detailed description and illustrated in the accompanying drawings, those with ordinary skill in the art will appreciate that various modifications and alternatives to those details could be developed in light of the overall teachings of the disclosure. Particularly, the figures and exemplar embodiments of the rotor laminations are intended to show illustrative examples and not to be considered limiting in any sense. Accordingly, the particular arrangements disclosed are meant to be illustrative only and not limiting as to the scope of the invention which is to be given the full breadth of the appended claims and any and all equivalents thereof.

What is claimed is:

1. An electrical machine comprising:
   a stator;
   a rotor core disposed within the stator;
   the rotor core comprising a plurality of generally like laminations stacked end to end to form a contiguous rotor core, the rotor core being rotatable relative to the stator about a center axis, the rotor core having an outer diameter ($D_R$), each of the laminations having:
   a plurality of magnet slots being spaced radially inward of the rotor outer diameter with a first end of each of the magnet slots being adjacent to the rotor outer diameter and the magnet slots extending generally inward from their first ends toward the rotor center axis, the magnet slots having permanent magnets disposed therein, the permanent magnets disposed in the magnet slots defining a number of poles (P) for the machine, a pole pitch (pp) for the machine wherein the pole pitch $(pp)=(\pi \times D_R)/(P)$, the magnets defining a general axis of magnetization of each pole of the rotor core, edges of the magnet slots that face the general axis of magnetization defining a saturation boundary area; and
   a plurality of rotor bar slots spaced about the rotor core center axis, each of the rotor bar slots being radially inward of the rotor outer diameter with an end of the rotor bar slot being adjacent to the rotor outer diameter, the plurality of rotor bar slots having an asymmetric angular spacing about the rotor core;
   wherein the rotor bar slots disposed in the saturation boundary area are spaced from an adjacent magnet slot by a distance that is at least four percent of the pole pitch ("pp");
   a conductive material disposed in the rotor bar slots; and
   end members disposed on axial opposite ends of the rotor core, the end members being in electrical contact with the conductive material;
   wherein the rotor bar slots disposed outside of the saturation boundary are spaced from an adjacent magnet slot by a distance that is at least four percent of the pole pitch.

2. The machine of claim 1 wherein two or more of the rotor bar slots in the saturation boundary area each have a radially inward edge which defines a reference plane generally parallel to an adjacent magnet.

3. The machine of claim 1 wherein at least one of the rotor bar slots in the saturation boundary area has a radially inward edge which conforms generally to the shape of an adjacent magnet.

4. The machine of claim 1 wherein all of the rotor bar slots in the saturation boundary area are spaced from their respective adjacent magnet slots at substantially the same distance.

5. The machine of claim 1 wherein the conductive material comprises bars extending through the rotor bar slots.

6. The machine of claim 1 wherein the conductive material is cast through the rotor bar slots along with forming the end members.

7. The machine of claim 1 wherein the ends of the rotor bar slots are formed in the lamination adjacent the outer diameter at substantially the same distance.

8. The machine of claim 1 wherein the electrical machine has at least 4 poles.

9. A machine comprising:
   a rotor with laminations having a plurality of magnet slots radially inward of a peripheral edge of the rotor, the rotor peripheral edge defining a rotor outer diameter ($D_1$), the magnet slots having magnets disposed therein, the magnets defining a number of poles (P) of the machine and a pole pitch (pp) for the machine wherein the pole pitch $(pp)=(\pi \times/(P)$, the magnets defining a general axis of magnetization of each pole of the rotor, edges of the magnet slots that face the general axis of magnetization defining a saturation boundary area, the rotor further comprising a plurality of rotor bar slots, a first portion of the plurality of the rotor bar slots being disposed in the saturation boundary area, the first portion of the plurality of the rotor bar slots having a first angular spacing, a second portion of the plurality of the rotor bar slots being disposed outside of the saturation boundary area, the second portion of the plurality of the rotor bar slots having a second angular spacing, the first angular spacing being different from the second angular spacing, the rotor bar slots disposed in the saturation boundary area being spaced from an adjacent magnet slot by a distance that is at least four percent of the pole pitch, the rotor further comprising a conductive material disposed in the rotor bar slots; and
   end members on axial ends of the rotor in electrical communication with the conductive material in the rotor bar slots;

wherein the rotor bar slots disposed outside of the saturation boundary are spaced from an adjacent magnet slot by a distance that is at least four percent of the pole pitch.

10. The machine of claim 9 wherein two or more of the rotor bar slots in the saturation boundary area each have a radially inward edge which defines a reference plane generally parallel to an adjacent magnet slot.

11. The machine of claim 9 wherein at least one of the rotor bar slots in the saturation boundary area has a radially inward edge which conforms generally to the shape of an adjacent magnet slot.

12. The machine of claim 9 wherein the rotor bar slots in the saturation boundary area are spaced from their respective adjacent magnet slots at substantially the same distance.

13. The machine of claim 9 wherein the conductive material comprises bars extending through the rotor bar slots.

14. The machine of claim 9 wherein the conductive material is cast through the rotor bar slots along with forming the end members.

15. The machine of claim 9 wherein the rotor bar slots of the first portion each have a different shape.

16. The machine of claim 9 wherein the magnets are disposed in the magnets slots in a manner such that magnets are spaced from an end of the magnet slot adjacent the rotor peripheral edge and form a magnet slot aperture.

17. The machine of claim 16 wherein the conductive material is disposed in the magnet slot aperture.

18. The machine of claim 9 wherein the electrical machine has at least 4 poles.

* * * * *